United States Patent Office 2,865,310
Patented Dec. 23, 1958

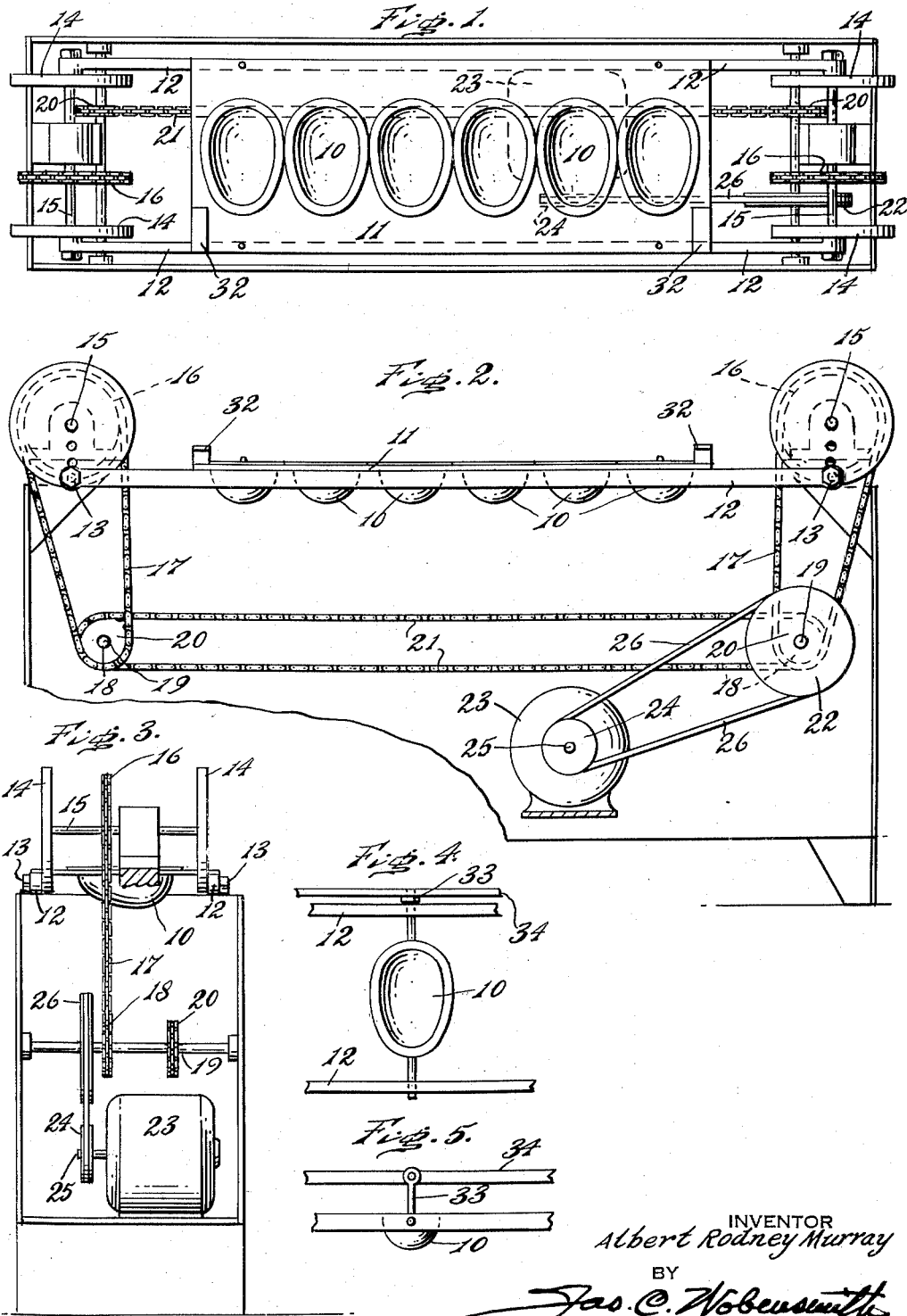

2,865,310

METHOD OF AND APPARATUS FOR FORMING CANDY EGGS

Albert Rodney Murray, Oreland, Pa., assignor to Minter Brothers, Inc., Philadelphia, Pa., a corporation of Pennsylvania Application October 24, 1956, Serial No. 617,988

6 Claims. (Cl. 107—8)

This invention relates to a method of and apparatus for forming candy eggs, that is to say, egg shaped masses of cream fondant, or the like, in the shape of eggs, which usually are afterward covered with chocolate or other suitable coating material.

The invention is particularly applicable to the formation of the so-called "Easter eggs" which are made and sold in large quantities during the Easter season.

Heretofore in the forming of masses of fondant or similar material in the shape of eggs for subsequent coating with chocolate or other suitable coating material, it was customary to form egg bodies in molds, into which the material was poured in a more or less liquid form, or, in other instances, the mass of fondant or body material was manipulated by hand to bring the individual egg bodies to the desired shape and consistency.

It is, of course, well known that for the best results a certain amount of manipulation of the candy egg bodies is necessary and desirable.

The principal object of the present invention is to provide a method of and apparatus for forming egg bodies of cream fondant, or other suitable masses of confectionery material, whereby the egg bodies may be quickly and easily brought to the desired shape and, at the same time, be subjected to the desired manipulation without necessarily using any human contact, whereby the operation will be clean and sanitary.

The nature and characteristic features of the present invention will be more readily understood from the following description, taken in connection with the accompanying drawing forming part hereof, in which:

Figure 1 is a top or plan view of a machine embodying the invention and for carrying out the method thereof;

Fig. 2 is a side elevation thereof;

Fig. 3 is an end elevation thereof;

Fig. 4 is a fragmentary plan view illustrating a modified form of mounting of the shaping devices; and Fig. 5 is a side elevation of the arrangement shown in Fig. 4.

It should, of course, be understood that the description and drawing herein are illustrative merely, and that various changes and modifications can be made in the mechanism shown without departing from the spirit of the invention.

Referring to the drawing in the particular embodiment of the invention therein shown, a plurality of molds 10 are provided, each of a size appreciably larger than the egg shaped body to be formed therein.

The molds 10 are semi-circular in cross-section, open at the top and mounted in a frame or plate 11. The plate 11 is removably mounted on connecting rods 12 which extend lengthwise in the machine on each side thereof.

Each of the connecting rods 12 is journaled at each end on a bolt or pin 13. The bolts or pins 13, to which the connecting rods 12 are pivotally connected, are mounted in discs 14 which are mounted on the ends of shafts 15, provided one at each end of the machine.

Each of the shafts 15 has a sprocket 16 secured thereon, and each of said sprockets 16 is connected by a chain 17 to a sprocket 18 disposed below on the drive shafts 19, also provided one at each end of the machine.

The shafts 19 are each provided with sprockets 20 and a drive chain 21 extends between and connects said sprockets 20.

One of the shafts 19 is also provided with a pulley 22 which is driven by means of an electric motor 23 and a pulley 24 mounted on the motor shaft 25. A belt 26 extends between the pulleys for driving the machine by means of the electric motor 23.

It will be noted that, by the foregoing arrangement, when the motor 23 is in operation the shafts 19, which are connected by the drive chain 21, will be rotated in unison, and likewise the shafts 15 disposed above the same will also be rotated in unison.

When said shafts 15 are rotated as aforesaid, the discs 14 on the ends of said shafts 15 will also be rotated in unison causing the ends of the conecting rods 12 to be moved in circular paths, and likewise, the molds 10 which are carried by the frame 11 which is removably mounted on the connecting rods 12 will also be caused to travel in circular paths with the openings thereof at all times disposed upwardly.

In the operation of the machine, a suitable quantity of fondant, or other material, which is to form the egg body is placed in each mold 10. The amount of material placed in each mold is appreciably less than the capacity of the mold whereby when the molds are constrained to travel in their respective circular paths, the material which is disposed in each of the molds will be moved about within the respective molds by reason of the circular motion and the egg bodies will be manipulated to form the same to the desired shape and the proper consistency.

When the required amount of manipulation has been done and the egg bodies are each brought to the desired shape, the frame or platform with the molds secured thereon may be removed from the connecting rods 12 by means of the handles 32, and turned over to discharge the contents of the molds.

In Figs. 4 and 5 of the drawing, there is shown a fragmentary detail of a modified form of means for supporting the molds on the connecting rods 12. In this form each of the molds will be pivotally mounted in the connecting rods 12, and provided with a crank arm 33 which is pivotally connected to an operating rod 34 whereby the mold may be turned over to discharge the contents by the proper manipulation of the rod 34. This form of the machine is preferred when a conveyor belt, not shown, is employed to carry away the formed egg bodies.

I claim:

1. The method of shaping and manipulating a candy egg body which consists in providing an oval mold of semi-circular cross-section transversely and open at the top, placing in said mold a mass of candy egg forming material of a volume less than the capacity of said mold, causing said mold to be moved in a circular path transversely to the longitudinal axis of the mold until the mass in said mold is brought to the requisite egg shape and desired consistency, and then upsetting said mold to remove the candy egg body therefrom.

2. The method of shaping and manipulating candy egg bodies which consists in providing a plurality of oval molds, each of semi-circular cross-section transversely and open at the top, placing in each of said molds a mass of candy egg forming material of a volume less than the capacity of said molds, causing said molds to be moved in unison, each in a circular path transversely to the longitudinal axes of said molds, until the mass in each mold is brought to the requisite egg shape and desired consistency, and then upsetting said molds to remove the candy egg bodies therefrom.

3. A machine for shaping and manipulating candy egg bodies having an oval mold of semi-circular cross-section transversely and open at the top, and means for moving said mold in a circular path transversely to the longitudinal axis of said mold thereby to form and manipulate a mass of candy egg forming material placed therein.

4. A machine for shaping and manipulating candy egg bodies having a plurality of oval molds each of semi-circular cross-section transversely and open at the top, and means for moving said molds in unison in a circular path transversely to the longitudinal axes of said molds whereby said molds will form and manipulate masses of candy egg forming material placed in said molds.

5. A machine for shaping and manipulating candy egg bodies which consists of a plurality of oval molds each of semi-circular cross-section transversely and open at the top, a holder in which said molds are mounted, and means for moving said holder in a circular path transversely to the longitudinal axes of said molds thereby to form and manipulate masses of candy egg forming material placed in said molds.

6. A machine for shaping and manipulating candy egg bodies which consists of a plurality of oval molds each of semi-circular cross-section transversely and open at the top, a holder in which said molds are mounted, said holder being removably mounted on connecting rods, the ends of said connecting rods each being journaled on pins each rotating in a circular path, and means for rotating said pins in unison whereby each of the molds will be constrained to travel in a circular path transversely to the longitudinal axes of said molds thereby to form and manipulate masses of candy egg body material placed in said molds.

References Cited in the file of this patent

UNITED STATES PATENTS

| | | |
|---|---|---|
| 947,405 | Baker | Jan. 25, 1910 |
| 1,341,081 | Sharp | May 25, 1920 |
| 1,576,149 | Siegert | Mar. 9, 1926 |
| 1,719,931 | Hall | July 9, 1929 |
| 1,948,870 | Pointon et al. | Feb. 27, 1934 |
| 2,108,067 | Lantinberg et al. | Feb. 15, 1938 |